United States Patent [19]

Trevino et al.

[11] Patent Number: 4,631,312

[45] Date of Patent: Dec. 23, 1986

[54] POLYMERIC COMPOSITIONS USEFUL AS BINDERS IN COATING COLORS AND COATING COLORS PREPARED THEREFROM

[75] Inventors: Jose L. Trevino, Rheinmunster, Fed. Rep. of Germany; Bernardus J. van Rooden, Richterswil, Switzerland

[73] Assignee: The Dow Chemical Company, Midland, Mich.

[21] Appl. No.: 715,551

[22] Filed: Mar. 25, 1985

[51] Int. Cl.[4] .................. C08L 33/02; C08L 33/04; C08L 33/18
[52] U.S. Cl. .................................. 525/221; 524/522
[58] Field of Search .......................................... 525/221

[56] References Cited

U.S. PATENT DOCUMENTS

| | | | |
|---|---|---|---|
| 3,081,198 | 3/1963 | Miller | 525/221 |
| 3,407,164 | 10/1968 | Schmidt | 525/221 |
| 3,811,904 | 5/1974 | Zola | 525/221 |
| 4,258,104 | 3/1981 | Lee et al. | 525/221 |
| 4,503,184 | 3/1985 | Marongiu | 525/221 |

*Primary Examiner*—Carman J. Seccuro

[57] ABSTRACT

The present invention relates to a polymeric binder composition comprised of two polymeric components wherein one of the two polymeric components is a lightly cross-linked copolymer comprising, in polymerized form, an $\alpha,\beta$-ethylenically unsaturated carboxylic acid, an ester of an $\alpha,\beta$-ethylenically unsaturated carboxylic acid and an unsaturated nitrile. In general, such cross-linking is achieved using a small amount of a cross-linking monomer such as allyl methacrylate.

13 Claims, No Drawings

POLYMERIC COMPOSITIONS USEFUL AS BINDERS IN COATING COLORS AND COATING COLORS PREPARED THEREFROM

BACKGROUND OF THE INVENTION

The present invention relates to a synthetic polymer composition useful as the binder component in coating colors and to coating colors containing these polymeric compositions.

In the production of paper, the paper surface is often coated with a composition (commonly referred to as a coating color) which imparts desirable properties such as printability to the paper. Conventionally, the coating color consists primarily of suspension of a pigment and/or filler such as clay in an aqueous medium containing a binder.

In one conventional method for applying the coating color, the coating is continuously transferred as a liquid film from an applicator roll to the paper surface, with any applied excess removed using suitable means such as blade or air-knife techniques. In the preparation of the highest quality paper, the paper is often coated sequential with a coating color of one composition and thereafter with a coating color of a second composition. In general, in the preparation of the double coated paper, the two coating colors contain the same or similar binders but different filler materials.

For various reasons, paper producers have continuously strived to reduce the finished weight of the coated paper. One method by which this can be achieved is by reducing the amount of the coating color applied to the paper. Unfortunately, a reduction in the coat weight generally results in a drop of the finished paper properties, particularly in the print quality. To effectively coat the paper, at the desirable coat weight, the coating colors advantageously exhibit desirable physical properties, e.g., stability and rheological properties. These properties are particularly important in the preparation of quality paper grades such as those printed by gravure techniques.

Heretofore, a natural, high molecular weight material such as starch or protein has been used as the binder component of the coating color. Unfortunately, these natural materials are susceptible to attack by microorganisms and when employed alone give brittle coatings. Moreover, using a starch binder, the coated paper often does not possess the required print quality due to insufficient coat hold-out, i.e., excessive penetration of the coating into the paper.

It has heretofore been suggested to employ synthetic polymers as the binder in paper coatings. Many such synthetic polymer binders consist of two polymeric components with one copolymer being employed primarily to impart the desired binding strength and other properties to the coated paper and the second copolymer component being employed primarily to affect the rheological properties of the coating colors prepared therefrom. For example, German Patent No. 1,546,315 discloses a synthetic polymer binder comprising 60 to 95 percent of a first copolymer of butadiene, styrene and/or acrylonitrile and 5 to 40 percent of a second copolymer of acrylic or methacrylic acid, a monomer which forms a water-insoluble homopolymer (at least a portion of which is an ester of acrylic or methacrylic acid) and, optionally, acryl- or methacrylamide. Unfortunately, coating colors prepared from this binder are generally deficient, particularly using gravure printing techniques, due again to insufficient coat hold-out. In addition, using coating colors prepared from the described polymeric binders difficulties are experienced in the preparation of a double coated paper. Specifically, an undesirable number of paper breaks and discontinuities on the coated paper are experienced using the coating colors prepared from these copolymer binders.

A similar synthetic polymeric binder, except that the first copolymer is derived from an ester of acrylic or methacrylic acid, a vinyl ester or propionic acid, and optionally other copolymerizable monomers, is described by U.S. Pat. No. 3,365,410. While coating colors prepared using these polymeric binders improve the print quality of paper prepared therefrom, a further improvement in the balance of the paper properties is required.

In view of the aforementioned deficiencies of the synthetic polymer binders employed heretofore, it remains highly desirable to provide a polymeric composition which can effectively be employed as the binder in a paper coating color to impart an improved balance of properties in the paper coated therewith.

SUMMARY OF THE INVENTION

The present invention is an improved polymeric composition useful as the binder component in a coating color. The polymeric composition is composed of two polymeric components: a binder copolymer, and the improvement comprising the inclusion of a rheology control polymer of a lightly cross-linked copolymer comprising, in polymerized form, an $\alpha,\beta$-ethylenically unsaturated carboxylic acid, an ester of an $\alpha,\beta$-ethylenically unsaturated carboxylic acid and an unsaturated nitrile. The lightly cross-linked copolymer (hereinafter referred to as the "rheology control copolymer") is cross-linked sufficiently to improve the rheological and/or other properties of the polymeric composition and/or coating colors prepared therefrom.

In general, such cross-linking in the copolymer is achieved by using a small amount (i.e., from 0.01 to 10 weight percent) of a cross-linking monomer. The other copolymer (hereinafter referred to as the "binder copolymer") is generally a copolymer of a monovinylidene aromatic, a conjugated diene and, optionally, other copolymerizable monomers or a copolymer of an ester of an $\alpha,\beta$-ethylenically unsaturated carboxylic acid, a comonomer which forms a water-insoluble homopolymer and, optionally, one or more copolymerizable monomers.

In a preferred embodiment, the binder copolymer comprises, based on 100 weight parts, at least 60 weight parts in polymerized form, or from 10 to 90 weight percent of a monovinylidene aromatic and from 10 to 90 weight percent of a conjugated diene, said weight percents being based on the total weight of the monovinlidene aromatic and the conjugated diene. The binder copolymer may comprise, in polymerized form, up to 20 weight parts of an $\alpha,\beta$-ethylenically unsaturated carboxylic acid and up to 20 weight parts of other copolymerized monomers. The rheology control polymer comprises, based on 100 weight parts, in polymerized form, from 40 to 90 weight parts of an ester of an $\alpha,\beta$-ethylenically unsaturated carboxylic acid; from 1 to 30 parts of an $\alpha,\beta$-ethylenically unsaturated carboxylic acid; from 0.5 to 30 weight parts of an ethylenically unsaturated nitrile and from 0.01 to 10 weight parts of a cross-linking monomer.

The coating colors containing a sufficiently cross-linked polymeric component possess rheological and/or other properties which cannot be obtained without the cross-linking. In addition, the flexibility imparted by the cross-linked structure allows ready adaptability of the polymeric binder composition to various formulations in the preparation of coating colors. Paper coated with the coating colors exhibit unexpectedly high binding strengths and excellent printability.

The polymeric compositions of the present invention are useful as the binder component in various compositions, particularly coating colors. They are particularly useful as the binder component in coating colors employed in the two step coating processes for preparing the highest quality paper used in rotogravure printing.

DETAILED DESCRIPTION OF THE INVENTION

The polymeric composition of the present invention comprises two polymeric components, herein referred to as a binder copolymer and a rheological control polymer. The binder copolymer which primarily imparts the binding strengths and other properties to the coated paper is preferably derived from a monovinylidene aromatic, a conjugated diene and, optionally, other monomers copolymerizable therewith. Representative monovinylidene aromatics include styrene; $\alpha$-alkyl styrenes such as $\alpha$-methyl styrene and $\alpha$-ethyl styrene; nuclear substituted, alkyl substituted styrenes such as vinyl toluene, $\alpha$-ethyl styrene, 2,4-dimethyl styrene, nuclear substituted halo-styrene such as chlorostyrene and 2,4-dichlorostyrene; styrene substituted with both a halo and alkyl group such as 2-chloro-4-methyl styrene and combinations thereof. In general, styrene, or a combination of styrene with small amounts (i.e., less than 10 weight percent of the monovinylidene aromatic employed) of one or more other monovinylidene aromatics, particularly an $\alpha$-alkylstyrene, are preferred. Most preferably, styrene is employed as the monovinylidene aromatic. The conjugated diene is an alkadiene, preferably a 1,3-conjugated diene such as butadiene, isoprene, propylene, chloroprene and the like. The preferred conjugated diene is 1,3-butadiene.

Often, but not necessarily, the binder copolymer comrpises one or more additional copolymerizable monomers. Such comonomers are employed to vary the properties of the resulting polymer and the specific comonomers and their amounts selected to obtain a copolymer having desirable properties. For example, to increase the binding strength of a coated paper, it is often desirable to employ an $\alpha,\beta$-ethylenically unsaturated carboxylic acid such as acrylic, methacrylic, itaconic, fumaric or maleic acid in the preparation of the binder copolymer. Preferred of such acids are itaconic or acrylic acid or a combination thereof. Other comonomers which are often advantageously employed in the presence of such copolymer binder include unsaturated nitriles such as acrylonitrile and methacrylonitrile, the halo-substituted olefins such as vinylidene chloride, esters of $\alpha,\beta$-ethylenically unsaturated carboxylic acids, ethylenically unsaturated amides such as acrylamide and methylacrylamide, and the ethylenically unsaturated alcohols.

The relative proportions of the monovinylidene aromatic, conjugated diene and other comonomers, if employed in the preparation of the preferred binder copolymer, are dependent on a variety of factors including the specific monovinylidene aromatic and conjugated diene employed and the desired properties of the binder copolymer. For example, the binder copolymer advantageously exhibits a second-order transition temperature, as defined by P. J. Flory in "Principles of Polymer Chemistry" published in 1953 by Cornell University Press, Ithaca, N.Y., page 56, between $-60°$ and $+40°$ C. and the monomers and their amounts selected accordingly. In general, the binder copolymer comprises at least 60, preferably at least 80, more preferably at least 90, weight percent of the monovinylidene aromatic and conjugated diene, said weight percents being based on the total weight of the first copolymer. In general, the monovinylidene aromatic is employed in amounts from 10 to 90, preferably from 50 to 70 weight percent and the conjugated diene is employed in amounts from 10 to 90, preferably from 30 to 50 weight percent, said weight percents being based on the total amount of monovinylidene aromatic and conjugated diene employed in the preparation of the binder copolymer. The $\alpha,\beta$-ethylenically unsaturated carboxylic acids are employed in amounts from zero to 20 weight percent, preferably from 1 to 5 weight percent, and the other copolymerizable monomers are employed in amounts from zero to 20, more generally from zero to 5 weight percent, said weight percents being based on the total weight of the binder copolymer. In general, the binder copolymer of the present invention is preferably derived from 50 to 70 weight percent of a monovinylidene aromatic, particularly styrene, from 30 to 50 weight percent of a conjugated diene, particularly 1,3-butadiene, and from 1 to 5 weight percent of an $\alpha,\beta$-ethylenically unsaturated carboxylic acid, particularly itaconic acid, acrylic acid or a combination thereof.

Alternatively, but less preferably, the binder copolymer is derived from an ester of an $\alpha,\beta$-ethylenically unsaturated carboxylic acid and a comonomer which forms a water-insoluble homopolymer. Representative esters are the esters of acrylic and/or methacrylic acids with alcohols having from 1 to 8 carbon atoms including ethyl acrylate, n-butyl acrylate, i-butyl acrylate, 2-ethylhexyl acrylate and the like. Esters of acrylic acid with alcohols having from 4 to 8 carbon atoms are preferred. Representative comonomers which form a water-insoluble homopolymer include generally the monovinylidene aromatics, particularly styrene; the unsaturated nitriles, particularly acrylonitrile; the vinyl esters of a monocarboxylic acid, particularly vinyl acetate of vinyl propionate; the halo-olefins such as vinyl chloride or vinylidene chloride; or a combination thereof. The preferred of such comonomers are the vinyl esters, particularly vinyl acetate and vinyl propionate. In general, the binder copolymer will comprise from 10 to 90, preferably from 35 to 60 weight percent of the ester of an unsaturated carboxylic acid and from 10 to 90, preferably from 35 to 60 weight percent of the vinyl acetate, and optionally, up to 10 weight percent of a further comonomer, said weight percents being based on the total weight of the binder copolymer. Although such further comonomer can be a comonomer which forms a water-insoluble homopolymer, it is more advantageously an $\alpha,\beta$-ethylenically unsaturated carboxylic acid, preferalby an acid having from 3 to 5 carbon atoms, including acrylic, methacrylic, crotonic, maleic, fumaric or itaconic acid and their amides, monoalkylamides, dialkylamides, N-methylolamides and esters of the N-methylolamides, including the half amides and half esters of the di-carboxylic acids; or a more strongly acidic comonomer such as vinyl sulfonic acid and p-toluene sulfonic acid. Preferred of such comonomers are the α,β-ethylenically unsaturated acids, particularly those acids having from 3 to 5 carbon atoms. These acids are preferably employed in amounts from 0.1 to 5 weight percent based on the total weight of the binding copolymer.

The rheology control polymeric component comprises a lightly cross-linked copolymer of an α,β-ethylenically unsaturated acid, an ester of an α,β-ethylenically unsaturated carboxylic acid and an unsaturated nitrile.

The esters of the α,β-ethylenically unsaturated acids advantageously employed in the present invention are those esters of a carboxylic acid having from 3 to 5 carbon atoms such as acrylic, methacrylic, maleic, fumaric or itaconic acids (preferably acrylic or methacrylic acids) with alcohols having from 2 to 10 carbon atoms, preferably 2 to 4 carbon atoms. Exemplary esters are ethyl acrylate, propyl acrylate, butyl acrylate, propyl methacrylate and the like.

The unsaturated carboxylic acids advantageously employed herein are those carboxylic acids which contain from 3 to 10 carbon atoms. Representative of such acids are acrylic, methacrylic, crotonic, itaconic, fumaric and ethacrylic acids.

Representative of ethylenically unsaturate nitriles include acrylonitrile, methacrylonitrile, maleic nitrile and cinnamonitrile.

In general, a cross-linking monomer, i.e., a copolymerizable monomer which when included in the polymerization recipe introduces cross-linkages into the resulting polymer, is employed to lightly cross-link the rheology control. Representative cross-linking monomers include the ethylenically unsaturated monomers which contain two or more non-conjugated terminal ethylenic groups. Examples of such monomers are the polyvinylidene aromatics such as divinylbenzene, divinyltoluene, divinylxylene and trivinylbenzene; the allyl or butenyl acrylates and/or methacrylates such allyl methacrylate, ethylene glycol dimethylacrylate and the like. Preferred cross-linking monomers contain from 4 to 15 carbon atoms, with allyl acrylate and allyl methacrylate being most preferred.

The specific monomeric components and the like relative proportions of each, including the cross-linking monomer and its amounts, most advantageously employed in preparing the rheology control polymer are dependent on a variety of factors including the composition of the binder copolymer employed and the desired properties of the coating color prepared therefrom. For example, if the binder copolymer is a copolymer of an ester of an unsaturated acid and a vinyl ester of an unsaturated carboxylic acid, the desired polymeric properties of the copolymers can often be obtained using a lightly cross-linked polymer derived from the ester of an unsaturated carboxylic acid, preferably from 40 to 90 weight percent of an ester of acrylic acid with an alcohol having from 1 to 8 carbon atoms; the unsaturated carboxylic acid, preferably from 5 to 40 weight percent of acrylic and/or methacrylic acid; and an unsaturated nitrile, preferably from 0.5 to 25 weight percent of acrylonitrile, said weight percents being based on the total weight of the rheology control polymer. The cross-linking is advantageously incorporated using from 0.05 to 5 weight percent of a cross-linking monomer, preferably from 0.05 to 2 weight percent of allyl acrylate or methacrylate. In addition, small amounts (i.e., less than 10 weight percent) of a vinyl ester of a monocarboxylic acid can optionally be employed.

Alternatively, when the binder copolymer is a copolymer derived primarily from a monovinylidene aromatic and a conjugated diene, to obtain the most desirable properties, the lightly cross-linked rheology control polymer is advantageously derived from 40 to 90 weight percent of the ester of an unsaturated carboxylic acid, preferably from 45 to 75 weight percent of ethyl acrylate and/or ethyl methacrylate; from 1 to 30 weight percent of an unsaturated carboxylic acid, preferably from 5 to 25 weight percent acrylic and/or methacrylic acid; from 0.5 to 30 weight percent of an unsaturated nitrile, preferably from 5 to 25 weight percent of acrylonitrile or mixtures of acrylonitrile with maleic nitrile or methacrylonitrile; and 0.01 to 10 weight percent of a cross-linking monomer, preferably from 0.05 to 5 weight percent of allyl acrylate and/or allyl methacrylate, wherein said weight percents are based on the total weight of the rheology control copolymer.

Most preferably, the rheology control copolymer comprises, in polymerized form, from 50 to 70 weight percent ethyl acrylate, from 10 to 20 weight percent methacrylic acid, from 10 to 20 weight percent acrylonitrile and from 0.05 to 2 weight percent of a cross-linking monomer, particularly allyl methacrylate.

The binder copolymer and rheology control copolymer are prepared separately using continuous, semi-continuous or batch emulsion polymerization techniques. Such techniques are well-known in the art and reference is made thereto for the purposes of this invention. In general, the polymeric components are prepared by dispersing the desired monomers in an aqueous polymerization medium which typically contains an emulsifying agent and other conventionally employed polymerization aids, e.g., chain teansfer agent and chelating agent.

Free radical initiation means which are advantageously employed include UV light and conventional chemical initiators such as peroxygens, e.g., hydrogen peroxide and cumene hydroperoxide; persulfates, e.g., potassium persulfate, sodium persulfate and ammonium persulfate; organic azo compounds such as azobisisobutyronitrile; redox initiators such as peroxide in combination with a sulfite or thiosulfate reducing agent; and the like. Typically, such initiators are employed in amounts which generally range from 0.01 to 5 weight percent based on the total weight of the monomers being polymerized.

In preparing the copolymers, surfactants advantageously employed are anionic and nonionic surfactants conventionally employed heretofore in emulsion polymerizations. Representative anionic surfactants useful herein include the alkyl aryl sulfonates such as sodium dodecylbenzene sulfonate, alkylphenoxy polyethylene sulfonates and phosphates, sodium lauryl sulfate, potassium lauryl sulfonate and the like. Representative nonionic surfactants useful herein include the reaction product of an alkylene oxide with alkylated phenols or long chain, e.g., from 6 to 20 carbon atoms, fatty alcohols, fatty acids, alkyl mercaptans and primary amines; mono esters, e.g., the reaction product of polyethylene glycol with a long chain carboxylic acid with polyglycol esters of a polyhydric alcohol. The surfactants are employed in an amount which effectively stabilizes the dispersion during polymerization. In general, such amount will vary from 0.1 to 5 weight percent based on the total weight of the monomers employed. To assist in controlling the molecular weight of the resulting polymers, a chain transfer agent is often, but optionally included in the aqueous polymerization medium. In general, chain transfer agents which have conventionally been employed heretofore in emulsion polymerization processes can be employed in the practice of the present invention. Representative chain transfer agents include the mercaptans such as n-dodecyl mercaptan cyclohexene, bromoform, carbon tetrabromide, carbon tetrachloride and the like. When employed, the chain transfer agents are generally advantageously employed in amounts from 0.05 to 5 weight percent based on the total weight of the monomers.

Polymerization is advantageously conducted at as low a temperature sufficient to polymerize the monomers at a practical rate. In general, the polymerization is conducted at temperatures from 40°–100° C., preferably from 60°–90° C., for periods sufficient to convert desired amounts of monomer to the desired polymer (generally the conversion of at least 90 percent of the monomer to polymer) which conventionally takes from 1–6 hours. The polymer dispersions may be prepared over a wide range of concentrations, with the resulting aqueous dispersions advantageously ranging from 20 to 60 weight percent solids.

The polymeric composition of the present invention is prepared by admixing the desired amounts of the binder copolymer with the rheology control copolymer. The relative concentrations of the binder copolymer and the rheology control copolymer are selected on the basis of the desired properties of the polymeric composition and the coating color prepared therefrom. In general, the binder copolymer is employed in amounts from 50 to 97, preferably 60 to 90, more preferably 70 to 90 weight percent and the rheology control copolymer is used in amounts from 3 to 50, preferably 10 to 40, more preferably 10 to 30 weight percent, said weight percents being based on the total weight of the two copolymers.

The method by which the two polymers are admixed is not particularly critical to the practice of the present invention. In general, the two polymer dispersions will be compatible with one another, especially if any carboxyl groups contained in either or both copolymers are not neutralized or only partially neutralized prior to admixture. The admixture of the two polymer dispersions is readily achieved by mixing the dispersion of the first binder copolymer, as prepared, with the dispersion of the rheology control copolymer, as prepared, using mild agitation.

In the preparation of coating colors using the polymeric compositions of this invention as the binder component, the polymeric composition of the present invention is commonly admixed with other, optionally employed adjuncts, such as fillers and/or pigments including clay and, optionally chalk, or calcium carbonate, and, if desired, other adjuncts such as dispersing agents, lubricants or the like. Although such adjuncts can be mixed with either copolymer prior to their subsequent admixture in general, an aqueous dispersion of the pigment and/or filler is prepared and the two copolymers are added thereto, with agitation shortly before use. Prior to the application of a coating color containing the polymeric composition of the present invention to a paper surface, the carboxylic groups are advantageously neutralized by adding a basic material such as sodium or potassium hydroxide or ammonia, preferably sodium hydroxide. The alkali is added in an amount sufficient to give the aqueous dispersion containing the polymer a pH from 8 to 9.5. The resulting coating color can be applied to raw papers using any of the known methods.

The following examples are set forth to illustrate the invention and should not be construed to limit its scope. In the examples, all parts and percentages are by weight unless otherwise indicated.

EXAMPLE

Preparation of the Binder Copolymer

To a suitably sized polymerization flask equipped with agitation means, heating and cooling means, thermometer, and addition funnel, is added 60 parts water, 0.1 part of an anionic surfactant, 0.8 part of a free-radical initiator and 3 parts of a chain transfer agent. The vessel is purged with nitrogen and heated to 90° C. Over a 4-hour period, 57 parts of styrene, 39 parts of butadiene, 1 part of itaconic and 3 parts of acrylic acid are added concurrently with an aqueous stream comprising additional surfactant and free-radical initiator. The vessel is maintained at 90° C. during this addition and for an additional 2 hours. At this time, the polymerization is stopped. The resulting emulsion contains 50 percent solids and the particle size of the resulting styrene/butadiene/itaconic acid/acrylic acid copolymer is found to be approximately 1888 Å.

Preparation of the Rheology Control Polymer

To a suitably sized polymerization vessel similar to that used in the preparation of the first copolymer is added 188 parts of water, 0.02 part of a chelating agent and 0.5 part of an anionic surfactant. The vessel is then heated to 80° C. A first monomer feed stream comprising 60 parts ethylacrylate, 15 parts acrylonitrile, 25 parts methacrylic acid and 0.05 part of allylmethacrylate are added to the mildly stirred aqueous polymerization mixture for a period of about 4 hours. Coincident with the addition of the monomers, an additional 50 parts water, 2.0 parts of anionic surfactant, 0.2 part of sodium hydroxide, and 0.7 part of a free-radical initiator is added to the polymerization medium. The temperature of the vessel is maintained at 80° C. during the addition of the monomer and polymerization aids and for an additional 2 hours. At the end of this period, the flask is then cooled to ambient temperatures and the subsequent emulsion subjected to steam distillation to remove the unconverted monomer. The resulting emulsion contains about 30 percent solids.

Preparation of Coating Color

A polymeric blend is prepared by admixing, with mild agitation, 84 parts, on a dry basis, of the emulsion containing the binder copolymer with 16 parts, on a dry basis, of the emulsion containing the rheology control copolymer to form a blend of 46 weight percent solids.

A pre-coat, paper coating composition is prepared by adding 5 parts of this blend to 100 parts of calcium carbonate dispersed in an aqueous solution of 0.1 part sodium polyacrylate and 0.2 part sodium metaphosphate using vigorous agitation. The pH of the resulting admixture is then adjusted to 8.5 by the addition of caustic soda. The resulting pre-coat has 62 percent solids with a viscosity of 900 cps measured using a Brookfield viscometer, type No. RVT, using Spindle No. 5 at 100 rpm and 25° C.

An identical top-coat paper coating composition is prepared except that 100 parts of Dinkie A clay is used in place of the calcium carbonate. The resulting top-coat has 58 percent solids with a viscosity of 1600 cps measured using a Brookfield viscometer, type No. RVT, using Spindle No. 5 at 100 rpm and 15° C.

A base paper of 36 grams per square meter (g/m$^2$) is coated with the pre-coat composition at a speed of 600 m/min and at 10 g/m$^2$ coat weight with 6 percent moisture using a conventional blade coating technique. The pre-coated paper is then dried and subsequently coated with the top-coat composition at a speed of 600 m/min and at 10 g/m$^2$ coat weight with 6 percent moisture using a conventional blade coating technique. Excellent runability characteristics were observed. The binding strength of the coated paper is found to be 48 cm/sec when measured using conventional IGT test equipment with a pendulum drive, with the result being reported in centimeters per second to the first pick of the coated paper using a low viscosity oil at a printing pressure of 350 newtons per square centimeter. The printability of the coated paper is found to be above 45 mm when measured using a testing device for measuring printability of paper printed using rotogravure printing techniques, which has been adapted to a pendulum drive IGI tester, Type 2A, with the results being reported in millimeters (mm) to 20 missing dots using a printing pressure of 250 newtons/cm$^2$.

COMPARATIVE EXAMPLE

A double coated paper is prepared using the same coating techniques by coating the base paper with identical pre-coat and top-coat compositions except prepared with a polymeric binder composition of a first polymer of an acrylate and vinyl acetate and a second copolymer of an acrylate, carboxylic acid and an amide. The double coated paper exhibits a binding strength of only 24 cm/sec and approximately the same printability as the double coated paper using the pre-coat and top-coat composition prepared using the polymeric binder of the present invention.

As shown by this Comparative Example, the polymeric compositions of the present invention are exceptional binders for paper coatings. Specifically, the paper coatings prepared using the polymeric compositions of the present invention impart unexpectedly high binding strengths in combination with excellent printability characteristics.

What is claimed:

1. A polymeric composition useful as the binder component in a coating color, said polymeric composition comprising at least two different polymer components a binder copolymer polymerized from unsaturated monomers, at least one of which being selected form the group consisting of monovinylidene aromatic monomers, conjugated diene monomers and α,β-ethylenically unsaturated carboxylic acid ester monomers; and a lightly cross-linked, rheology control copolymer comprising an α,β-ethylenically unsaturated carboxylic acid, an ester of an α,β-ethylenically unsaturated carboxylic acid, an unsaturated nitrile, up to 10 weight percent of a vinyl ester of a monocarboxylic acid and from 0.01 to 10 weight percent of a cross-linking monomer, said weight percent being based on the total weight of said rheology control copolymer.

2. The polymeric composition of claim 1 wherein said binder copolymer comprises polymers of a monovinylidene aromatic and a conjugated diene.

3. The polymeric composition of claim 1 wherein the composition comprises from 50 to 97 weight percent of the binder copolymer and from 3 to 50 weight percent of the rheology control copolymer, these weight percents being based on the total amount of the rheology control polymer and the binder copolymer.

4. The polymeric composition of claim 3 wherein the polymeric composition comprises from 60 to 90 weight parts of a binder copolymer comprising, based on 100 weight parts, at least 60 weight parts, in polymerized form, of a monvinylidene aromatic and a conjugated diene, the monovinylidene aromatic and conjugated diene being employed in amounts such that the monovinylidene aromatic comprises from 10 to 90 weight percent and the conjugated diene comprises from 10 to 90 weight percent of the total weight of the monovinylidene aromatic and conjugated diene employed and from 10 to 40 weight parts of a rheology control copolymer comprising, based on 100 weight parts, in polymerized form from 40 to 90 weight parts of an ester of an α,β-ethylenically unsaturated carboxylic acid, from 1 to 30 weight parts of an α,β-ethylenically unsaturated carboxylic acid, from 0.5 to 30 weight parts of an ethylenically unsaturated nitrile and from 0.01 to 10 weight parts of a cross-linking monomer.

5. The polymeric composition of claim 4 wherein the binder copolymer further comprises up to 20 weight percent of an α,β-ethylenically unsaturated carboxylic acid.

6. The polymeric composition of claim 4 wherein the binder copolymer is composed based on 100 weight parts, in polymerized form, of from 50 to 70 weight parts of a monovinylidene aromatic, from 30 to 50 weight parts of a conjugated diene and from 1 to 5 weight parts of an α,β-ethylenically unsaturated carboxylic acid.

7. The composition of claim 6 wherein the monovinylidene aromatic is styrene, the conjugated diene is 1,3-butadiene and the unsaturated carboxylic acid is itaconic and/or acrylic acid.

8. The polymeric composition of claim 8 wherein the rheology control copolymer is composed, based on 100 weight parts, in polymerized form, of from 50 to 70 weight parts ethylacrylate and/or ethylmethacrylate, from 10 to 20 weight parts of acrylic acid and/or methacrylic acid, from 10 to 20 weight parts of acrylonitrile and from 0.05 to 2 weight parts of allyl methacrylate and/or allyl acrylate.

9. The polymeric composition of claim 3 wherein the binder copolymer is derived from 35 to 60 weight percent of an ester of acrylic and/or methacrylic acid with an alcohol having from 1 to 8 carbon atoms, and from 35 to 60 weight percent of a vinyl acetate and/or vinyl propionate, said weight percents being based on the total weight of the binder copolymer.

10. The polymeric composition of claim 9 wherein the rheology control copolymer is derived from 40 to 90 weight percent of an ester of acrylic acid with an alcohol having from 1 to 8 carbon atoms, from 5 to 40 weight percent of acrylic and/or metacrylic acid, from 0.5 to 25 weight percent of acrylonitrile and up to 10 weight percent of a vinyl ester of a monocarboxylic acid and from 0.05 to 5 weight percent of a cross-linking monomer, said weight percents being based on the toal weight of the rheology control polymer.

11. A paper coating comprising a suspension of a pigment and/or filler in an aqueous medium and containing, as the binder component, the polymeric composition of claim 1.

12. The paper coating of claim 12 wherein the polymeric composition comprises a binder copolymer from 60 to 90 weight percent of an ester of acrylic and/or methacrylic acid with an alcohol having from 1 to 8 carbon atoms, and from 35 to 60 weight percent of a vinyl acetate and/or vinyl propionate, said weight percents being based on the total weight of the binder copolymer, and from 10 to 40 weight parts of a rheology control copolymer derived from 40 to 90 weight percent of an ester of acrylic acid with an alcohol having from 1 to 8 carbon atoms, from 5 to 40 weight percent of acrylic and/or methacrylic acid, from 0.5 to 25 weight percent of acrylonitrile, up to 10 weight percent of a vinyl ester of a monocarboxylic acid and from 0.05 to 2 weight percent of a cross-linking monomer, said weight percents being based on the total weight of the rheology control polymer.

13. The polymeric composition of claim 1 wherein said binder copolymer comprises an ester of an $\alpha,\beta$-ethylenically unsaturated carboxylic acid and a comonomer which forms a water-insoluble homopolymer.

* * * * *

UNITED STATES PATENT AND TRADEMARK OFFICE
CERTIFICATE OF CORRECTION

PATENT NO. : 4,631,312

DATED : December 23, 1986

INVENTOR(S) : Jose L. Trevino and Bernardus J. van Rooden

It is certified that error appears in the above-identified patent and that said Letters Patent is hereby corrected as shown below:

Column 2, lines bridging 56 and 57, "monovinlidene" should read -- monovinylidene --.

Column 3, line 30 "$\alpha$" should read -- o --; and line 45, "comrpises" should read -- comprises --.

Column 4, line 62, "preferalby" should read -- preferably --.

Column 5, line 26, "unsaturate" should read -- unsaturated --; and line 40, "such allyl" should read -- such as allyl --.

Column 6, line 36, "teansfer" should read -- transfer --.

Column 9, line 52, "components" should read -- components: --; and line 54, "form" should read -- from --.

Column 10, Claim 3, line 6, "polymer" should read -- copolymers --; Claim 4, line 5, "monvinylidene" should read -- monovinylidene --; Claim 10, line 5, "metacrylic" should read -- methacrylic --; Claim 10, line 9, "toal" should read -- total --.

Signed and Sealed this

Thirteenth Day of October, 1987

*Attest:*

DONALD J. QUIGG

*Attesting Officer*     *Commissioner of Patents and Trademarks*